(12) United States Patent
Heintzelman et al.

(10) Patent No.: US 10,743,523 B1
(45) Date of Patent: Aug. 18, 2020

(54) PET MONITORING SYSTEM

(71) Applicant: Honeywell International Inc., Morris Plains, NJ (US)

(72) Inventors: Christopher Heintzelman, Plymouth, MN (US); Brian Beale, Woodbury, MN (US); Joseph Bodkin, South Burlington, VT (US); John Cronin, Jericho, VT (US)

(73) Assignee: Honeywell International Inc., Morris Plains, NJ (US)

( * ) Notice: Subject to any disclaimer, the term of this patent is extended or adjusted under 35 U.S.C. 154(b) by 0 days.

(21) Appl. No.: 16/294,729

(22) Filed: Mar. 6, 2019

(51) Int. Cl.
*G08B 23/00* (2006.01)
*A01K 29/00* (2006.01)
*H04L 29/08* (2006.01)
*H04L 12/28* (2006.01)

(52) U.S. Cl.
CPC ............ *A01K 29/005* (2013.01); *H04L 67/12* (2013.01); *H04L 12/2803* (2013.01)

(58) Field of Classification Search
CPC .... A01K 29/005; H04L 67/12; H04L 12/2803
USPC ...................................... 340/573.3
See application file for complete search history.

(56) References Cited

U.S. PATENT DOCUMENTS

| | | | |
|---|---|---|---|
| 9,642,340 B2 | 5/2017 | Brown, Jr. et al. | |
| 9,772,612 B2 | 9/2017 | McCarthy, III et al. | |
| 9,804,596 B1 | 10/2017 | Slavin | |
| 2010/0289643 A1 | 11/2010 | Trundle et al. | |
| 2014/0031989 A1 | 1/2014 | Bergman et al. | |
| 2014/0275824 A1 | 9/2014 | Couse | |
| 2016/0248847 A1* | 8/2016 | Saxena | H04L 67/18 |
| 2016/0302393 A1 | 10/2016 | Pradeep et al. | |
| 2017/0192435 A1 | 7/2017 | Bakhishev et al. | |

FOREIGN PATENT DOCUMENTS

| | | |
|---|---|---|
| WO | 2015184297 A1 | 12/2015 |
| WO | 2017208068 A1 | 12/2017 |

OTHER PUBLICATIONS

"Home Security Blog," Vector Security Team, 7 pages, Jun. 6, 2013.

* cited by examiner

*Primary Examiner* — Tanmay K Shah
(74) *Attorney, Agent, or Firm* — Shumaker & Sieffert, P.A.

(57) ABSTRACT

A pet monitoring system comprising a first sensor configured to detect a first condition in the space and a second sensor configured to detect a second condition in the space is disclosed. The system may further comprise a memory for storing one or more rules each configured to identify an alert condition for a pet in the space based on the first and/or second conditions in the space, a communications module configured to communicate with a remote device over a network, and a controller. The controller is configured to apply the one or more rules to the first and second detected conditions in the space to identify one or more alert conditions and determine what, if any, action is required by an owner or caretaker of the pet, and if action is required, provide an alert to the remote device via the communications module.

20 Claims, 10 Drawing Sheets

| System ID | Sensor | Location | Data | Time | Duration |
|---|---|---|---|---|---|
| TL1234 | Motion Sensor 1 | Kitchen | Movement | 9:30am | 1 Minute |
| TL1234 | Motion Sensor 1 | Kitchen | No Movement | 9:31am | 10 Minutes |
| TL1234 | Motion Sensor 1 | Kitchen | Movement | 9:41 | 5 Minutes |
| - | - | - | - | - | - |
| TL1234 | Motion Sensor 2 | Living Room | No Movement | 9:30am | 1 Minute |
| TL1234 | Motion Sensor 2 | Living Room | Movement | 9:31am | 10 Minutes |
| TL1234 | Motion Sensor 2 | Living Room | No Movement | 9:41 | 5 Minutes |
| TL1234 | Temperature Sensor 1 | Bedroom | 67 F | 9:30am | 20 Minutes |
| TL1234 | Temperature Sensor 2 | Bedroom | 66 F | 9:50am | 20 Minutes |
| TL1234 | Temperature Sensor 3 | Bedroom | 67 F | 10:00am | 20 Minutes |
| - | - | - | - | - | - |
| - | - | - | - | - | - |
| - | - | - | - | - | - |
| - | - | - | - | - | - |

FIG. 7

|     | Animal | Sensor 1 | Sensor 2 | Sensor N | Duration | Recommendation |
| --- | --- | --- | --- | --- | --- | --- |
| 502 | Dog | No Motion | - | - | 2 Hours | Notify Owner of No Motion |
| 504 | Dog | No Motion | Temp. 80+ | - | 30 Minutes | Notify Owner of Heat Warning |
| 506 | Dog | No Motion | Temp. 80+ | Humidity-70% | 30 Minutes | Notify Owner of Heat Warning |
| 508 | Dog | Thermal-104 | - | - | 1 Hour | Notify Owner of Overheating |
| 510 | Dog | Thermal-104 | Temp. 80+ | - | 30 Minutes | Request Pet Caretaker |
| 512 | Dog | Thermal-104 | Temp. 80+ | No Motion | 15 Minutes | Notify Owner, Request Pet Caretaker |
| - | - | - | - | - | - | - |
| - | - | - | - | - | - | - |
| 514 | Cat | No Motion | - | - | 3 Hours | Notify Owner of No Motion |
| 516 | Cat | No Motion | Temp. 80+ | - | 1 Hour | Notify Owner of Heat Warning |
| 518 | Cat | No Motion | Temp. 80+ | Humidity-70% | 45 Minutes | Notify Owner of Heat Warning |
| - | - | - | - | - | - | - |
| - | - | - | - | - | - | - |
| - | - | - | - | - | - | - |

FIG. 8

| System ID ⎯602 | Sensor ⎯604 | Location ⎯606 | Data ⎯608 | Time ⎯610 | Duration ⎯612 |
|---|---|---|---|---|---|
| TL1234 | Motion Sensor 1 | Kitchen | Movement | 9:30am | 1 Minute |
| TL1234 | Motion Sensor 1 | Kitchen | No Movement | 9:31am | 10 Minutes |
| TL1234 | Motion Sensor 1 | Kitchen | Movement | 9:41 | 5 Minutes |
| - | - | - | - | - | - |
| JK9876 | Thermal Sensor 1 | Office | 91 F | 9:30am | 1 Minute |
| JK9876 | Thermal Sensor 1 | Office | 92 F | 9:31am | 2 Minutes |
| JK9876 | Thermal Sensor 1 | Office | 91 F | 9:33am | 1 Minute |
| - | - | - | - | - | - |
| PN6543 | Temperature Sensor 1 | Living Room | 71 F | 9:30am | 10 Minutes |
| PN6543 | Temperature Sensor 2 | Living Room | 72 F | 9:40am | 10 Minutes |
| PN6543 | Temperature Sensor 3 | Living Room | 71 F | 9:50am | 10 Minutes |
| - | - | - | - | - | - |
| - | - | - | - | - | - |
| - | - | - | - | - | - |
| - | - | - | - | - | - |

| Date | Time | Animal | Sensor 1 | Sensor 2 | Sensor N | Duration | Recommendation | Occurences |
|---|---|---|---|---|---|---|---|---|
| 6/19 2018 | 1:00PM | Dog | No Motion | Temp. 80+ | - | 2 Hours | Notify Owner of No Motion and High Temperature | 4 |
| 6/19 2018 | 1:00PM | Dog | Thermal 102 F | Temp. 80+ | - | 30 Minutes | Notify Owner of Heat Warning | 10 |
| 6/19 2018 | 1:01PM | Dog | No Motion | Temp. 80+ | Humidity 70% | 30 Minutes | Notify Owner of Heat Warning | 3 |
| 6/19 2018 | 1:02PM | Dog | Thermal 104 F | - | - | 30 Minutes | Notify Owner of Heat Warning | 5 |
| 6/19 2018 | 1:02PM | Dog | Temp. 85+ | Humidity 70% | - | 1 Hour | Notify Owner of Heat Warning | 2 |
| 6/19 2018 | 1:03PM | Dog | Thermal 102 F | No Motion | - | 30 Minutes | Notify Owner of No Motion | 3 |
| - | - | - | - | - | - | - | - | - |
| - | - | - | - | - | - | - | - | - |
| - | - | - | - | - | - | - | - | - |
| - | - | - | - | - | - | - | - | - |
| - | - | - | - | - | - | - | - | - |

FIG. 10

PET MONITORING SYSTEM

TECHNICAL FIELD

The disclosure generally relates to building monitoring systems, and more particularly to systems and methods for monitoring pets in a building.

BACKGROUND

Building Automation Systems (BAS) and/or various home control systems are used to control one of more functions of a building or home. A Building Automation System and/or a home control system can include, for example, an HVAC system, a lighting control system, a fire suppression systems, a security system, and/or any other suitable building automation system. A Building Automation System and/or home control systems typically include one or more sensors and/or other devices that are operatively coupled to a central controller or the like, often via wireless communication. These sensors and/or devices may be used to monitor parameters within the building or home, including, but not limited to, temperature, humidity, motion, etc. These sensors and/or devices may be tuned to filter out movement from pets.

What would be desirable are improved methods and systems for monitoring pets in a building or home.

SUMMARY

This disclosure generally relates to systems and method for monitoring a pet in a building.

In a first example, a method for monitoring a pet in a space of a building, wherein the space includes one or more sensors each sensing a sensed condition, may comprise storing two or more rules. Each rule may define a rule defined event that is detectable via one or more of the sensed conditions sensed by one or more of the sensors and a recommended action to take in response to the corresponding rule defined event. The method may further comprise monitoring the one or more sensed conditions of the one or more sensors over time, repeatedly applying the two or more rules to the one or more monitored sensed conditions of the one or more sensors to identify when a rule defined event of the two or more rules occurs, and performing the recommended action defined by the rule that resulted in the rule defined event.

Alternatively or additionally to any of the examples above, in another example, the rule defined event for at least one rule may comprise a failure to detect a presence of a pet.

Alternatively or additionally to any of the examples above, in another example, the rule defined event for at least one rule may comprise a failure to detect motion of a pet.

Alternatively or additionally to any of the examples above, in another example, the one or more sensors include a motion sensor, and wherein the rule defined event for at least one rule may comprise no detected pet motion from the motion sensor over a predetermined period of time.

Alternatively or additionally to any of the examples above, in another example, the motion sensor may comprise a camera.

Alternatively or additionally to any of the examples above, in another example, the one or more sensors may include a temperature sensor, and wherein the rule defined event for at least one rule may comprise a detected temperature that remains above a predetermined temperature over a predetermined period of time.

Alternatively or additionally to any of the examples above, in another example, the one or more sensors may include a motion sensor and a temperature sensor. A first rule defined event of a first rule may comprise no detected pet motion from the motion sensor over a first predetermined period of time and a second rule defined event of a second rule may comprise a detected temperature that remains above a first predetermined temperature over the second predetermined period of time.

Alternatively or additionally to any of the examples above, in another example, an additional rule defined event of the second rule may comprise no detected pet motion from the motion sensor over a second predetermined period of time.

Alternatively or additionally to any of the examples above, in another example, the one or more sensors may further comprise a humidity sensor. A third rule defined event of a third rule may comprise a detected humidity that remains above a predetermined humidity over the third predetermined period of time.

Alternatively or additionally to any of the examples above, in another example, one or more additional rule defined events of the third rule may comprise no detected pet motion from the motion sensor over a third predetermined period of time and/or a detected temperature that remains above a second predetermined temperature over the third predetermined period of time, and Alternatively or additionally to any of the examples above, in another example, the first predetermined period of time may be longer than the second predetermined period of time.

Alternatively or additionally to any of the examples above, in another example, the recommended action may comprise delivering an alert to a remote device over a network.

Alternatively or additionally to any of the examples above, in another example, the recommended action may comprise activating one or more non-activated sensors.

In another example, a pet monitoring system configured to be used in a space within a building may comprise a first sensor configured to detect a first condition in the space, a second sensor configured to detect a second condition in the space, a memory for storing one or more rules each configured to identify an alert condition for a pet in the space based on the first and/or second conditions in the space, a communications module configured to communicate with a remote device over a network, and a controller operatively coupled to the first sensor, the second sensor, the memory, and the communications module. The controller may be configured to apply the one or more rules to the first and second detected conditions in the space to identify one or more alert conditions and determine what, if any, action is required, and if action is required, provide an alert to the remote device via the communications module.

Alternatively or additionally to any of the examples above, in another example, the controller may be configured to activate a third sensor in response to the one or more alert conditions.

Alternatively or additionally to any of the examples above, in another example, the first sensor may comprise a motion sensor.

Alternatively or additionally to any of the examples above, in another example, the second sensor may comprise a temperature sensor.

Alternatively or additionally to any of the examples above, in another example, the first sensor and the second sensor may be located in the building, the controller and the communications module may be implemented by a remote server geographically spaced from the building, and the remote device may be a portable handheld device.

Alternatively or additionally to any of the examples above, in another example, the controller may be operatively coupled to the first sensor and the second sensor at least partially over a network.

Alternatively or additionally to any of the examples above, in another example, the first sensor and the second sensor may be located in the building, the controller and the communications module may be located in the building, and the remote device is a portable handheld device.

In another example, a server for monitoring a pet in a space of a building may comprise a memory for storing two or more rules. Each rule may define a rule defined event that is detectable via one or more of sensed conditions in the space and a recommended action to take in response to the corresponding rule defined event. The server may further comprise an input/output port for receiving one or more sensed conditions from the space and a controller operatively coupled memory and the input/output port. The controller may be configured to monitor the one or more sensed conditions over time, repeatedly applying the two or more rules to the one or more monitored sensed conditions to identify when a rule defined event of the two or more rules occurs, and perform the recommended action defined by the rule that resulted in the rule defined event.

Alternatively or additionally to any of the examples above, in another example, the one or more sensed conditions may comprise presence and/or motion of the pet, and wherein the rule defined event for a first rule of the two or more rules may comprise no detected pet motion over a predetermined period of time, and wherein the recommended action of the first rule may comprise sending an alert to a remote device via the input/output port.

The preceding summary is provided to facilitate an understanding of some of the features of the present disclosure and is not intended to be a full description. A full appreciation of the disclosure can be gained by taking the entire specification, claims, drawings, and abstract as a whole.

BRIEF DESCRIPTION OF THE DRAWINGS

The disclosure may be more completely understood in consideration of the following detailed description of various embodiments in connection with the accompanying drawings, in which:

FIG. 7 is an illustrative sensor database;

FIG. 8 is an illustrative rules database;

FIG. 9 is an illustrative network pet database; and

FIG. 10 is an illustrative network evaluation database.

Figure 1:
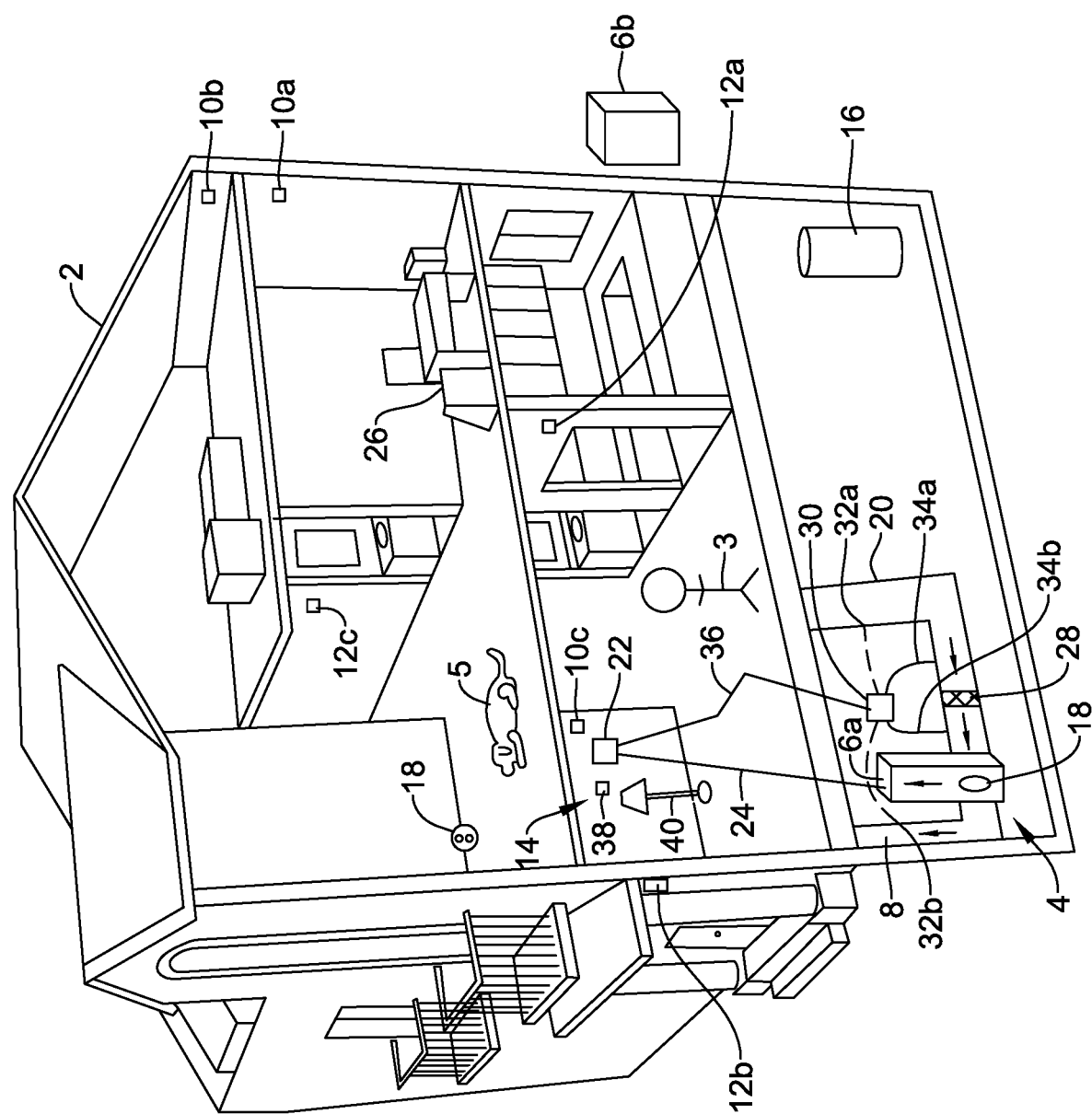
FIG. 1 is a schematic view of an illustrative building including various home automation systems.

While the disclosure is amenable to various modifications and alternative forms, specifics thereof have been shown by way of example in the drawings and will be described in detail. It should be understood, however, that the intention is not to limit aspects of the disclosure to the particular embodiments described. On the contrary, the intention is to cover all modifications, equivalents, and alternatives falling within the spirit and scope of the disclosure.

DESCRIPTION

The following detailed description should be read with reference to the drawings in which similar elements in different drawings are numbered the same. The detailed description and the drawings, which are not necessarily to scale, depict illustrative embodiments and are not intended to limit the scope of the disclosure. The illustrative embodiments depicted are intended only as exemplary. Selected features of any illustrative embodiment may be incorporated into an additional embodiment unless clearly stated to the contrary.

This disclosure generally relates to building and/or home automation systems, and more particularly to pet security monitoring through the building and/or home automation system. For clarity, the following description will be described with respect to a home automation system including a comfort system (e.g., an HVAC system), a security system, and/or any number of Internet of Things (IoT) devices (e.g., household devices having built-in wireless connectivity, sometimes called "smart" devices or "connected" devices), however the systems and methods described herein may be applied to commercial buildings, hotels, apartment buildings, etc. The home automation system may include one or more of an HVAC system, a lighting control system, a fire suppression system, a security system, and any other suitable home automation system devices.

FIG. 1 is a schematic view of a building 2 having an illustrative heating, ventilation, and air conditioning (HVAC) system 4 and an illustrative security system 14. The building 2 may be routinely occupied by a person or people 3 and, in some cases, one or more pets 5. While FIG. 1 shows a typical forced air type HVAC system, other types of HVAC systems are contemplated including, but not limited to, boiler systems, radiant heating systems, electric heating systems, cooling systems, heat pump systems, and/or any other suitable type of HVAC system, as desired. The illustrative HVAC system 4 of FIG. 1 includes one or more HVAC components 6a, 6b (collectively, 6), a system of ductwork and air vents including a supply air duct 8 and a return air duct 20, and one or more controllers 22. The one or more HVAC components 6 may include, but are not limited to, a furnace, a heat pump, an electric heat pump, a geothermal heat pump, an electric heating unit, an air conditioning unit, a humidifier, a dehumidifier, an air exchanger, an air cleaner, a damper, a valve, and/or the like.

The illustrative HVAC system 4 may further include one or more sensors or devices 10a, 10b (collectively, 10) configured to measure a parameter of the environment to be controlled. The one or more sensors or devices 10 may include, but are not limited to, temperatures sensors, humidity sensors, carbon dioxide sensors, occupancy sensors, proximity sensors, etc. Each of the sensor/devices 10 may be operatively connected to the controller 22 via a corresponding communications port (not explicitly shown). It is contemplated that the communications port may be wired and/or wireless. When the communications port is wireless, the communications port may include a wireless transceiver, and the controller 22 may include a compatible wireless transceiver. It is contemplated that the wireless transceivers may communicate using a standard and/or a proprietary communication protocol. Suitable standard wireless protocols may include, for example, cellular communication, ZigBee, Bluetooth, WiFi, IrDA, dedicated short range communication (DSRC), EnOcean, or any other suitable wireless protocols, as desired.

It is contemplated that the controller(s) 22 may be configured to control the comfort level in the building or structure by activating and deactivating the HVAC component(s) 6 in a controlled manner. The controller(s) 22 may be configured to control the HVAC component(s) 6 via a wired or wireless communication link 24. In some cases, the controller(s) 22 may be a thermostat, such as, for example, a wall mountable thermostat, but this is not required in all embodiments. Such a thermostat may include (e.g. within the thermostat housing) or have access to a temperature sensor for sensing an ambient temperature at or near the thermostat. In some instances, the controller(s) 22 may be a zone controller, or may include multiple zone controllers each monitoring and/or controlling the comfort level within a particular zone in the building or other structure. As will be described in more detail herein, the controller(s) 22 may be configured to control the security system and/or other home automation devices or to communicate with separate controllers dedicated to the security system and/or other home automation devices.

In the illustrative HVAC system 4 shown in FIG. 1, the HVAC component(s) 6 may provide heated air (and/or cooled air) via the ductwork throughout the building 2. While not explicitly shown, the HVAC component(s) 6 may be in fluid communication with every room and/or zone in the building 2 via the ductwork 8 and 20, but this is not required. In operation, when a heat call signal is provided by the controller(s) 22, an HVAC component 6a (e.g., forced warm air furnace) may be activated to supply heated air to one or more rooms and/or zones within the building 2 via supply air ducts 8. The heated air may be forced through supply air duct 8 by a blower or fan 17. In this example, the cooler air from each zone may be returned to the HVAC component 6 (e.g. forced warm air furnace) for heating via return air ducts 20. Similarly, when a cool call signal is provided by the controller(s) 22, an HVAC component 6b (e.g. air conditioning unit) may be activated to supply cooled air to one or more rooms and/or zones within the building or other structure via supply air ducts 8. The cooled air may be forced through supply air duct 8 by the blower or fan 17. In this example, the warmer air from each zone may be returned to the HVAC component 6b (e.g., air conditioning unit) for cooling via return air ducts 20. In some cases, the HVAC system 4 may include an internet gateway or other device 26 that may allow one or more of the HVAC components, as described herein, to communicate over a wide area network (WAN) such as, for example, the Internet.

In some cases, the system of vents or ductwork 8 and/or 20 can include one or more dampers (not explicitly shown) to regulate the flow of air, but this is not required. For example, one or more dampers may be coupled to one or more controller(s) 22, and can be coordinated with the operation of one or more HVAC components 6. The one or more controller(s) 22 may actuate dampers to an open position, a closed position, and/or a partially open position to modulate the flow of air from the one or more HVAC components 6 to an appropriate room and/or zone in the building or other structure. The dampers may be particularly useful in zoned HVAC systems, and may be used to control which zone(s) receives conditioned air from the HVAC component(s) 6.

In many instances, one or more air filters 28 may be used to remove dust and other pollutants from the air inside the building 2. In the illustrative example shown in FIG. 1, the air filter(s) 30 is installed in the return air duct 20, and may filter the air prior to the air entering the HVAC component 6, but it is contemplated that any other suitable location for the air filter(s) 30 may be used. The presence of the air filter(s) 28 may not only improve the indoor air quality, but may also protect the HVAC components 6 from dust and other particulate matter that would otherwise be permitted to enter the HVAC component.

In some cases, and as shown in FIG. 1, the illustrative HVAC system 4 may include an equipment interface module (EIM) 30. When provided, the equipment interface module 30 may, in addition to controlling the HVAC under the direction of the thermostat, be configured to measure or detect a change in a given parameter between the return air side and the discharge air side of the HVAC system 4. For example, the equipment interface module 30 may measure a difference in temperature, flow rate, pressure, or a combination of any one of these parameters between the return air side and the discharge air side of the HVAC system 4. In some cases, the equipment interface module 30 may be adapted to measure the difference or change in temperature (delta T) between a return air side and discharge air side of the HVAC system 4 for the heating and/or cooling mode. The delta T for the heating and cooling modes may be calculated by subtracting the return air temperature from the discharge air temperature (e.g. delta T=discharge air temperature−return air temperature)

In some cases, the equipment interface module 30 may include a first temperature sensor 32a located in the return (incoming) air duct 20, and a second temperature sensor 32b located in the discharge (outgoing or supply) air duct 8. Alternatively, or in addition, the equipment interface module 34 may include a differential pressure sensor including a first pressure tap 34a located in the return (incoming) air duct 20, and a second pressure tap 34b located downstream of the air filter 28 to measure a change in a parameter related to the amount of flow restriction through the air filter 28. In some cases, the equipment interface module 30, when provided, may include at least one flow sensor that is capable of providing a measure that is related to the amount of air flow restriction through the air filter 28. In some cases, the equipment interface module 34 may include an air filter monitor. These are just some examples.

When provided, the equipment interface module 30 may be configured to communicate with the controller 22 via, for example, a wired or wireless communication link 36. In other cases, the equipment interface module 30 may be incorporated or combined with the HVAC controller 22. In either case, the equipment interface module 30 may communicate, relay or otherwise transmit data regarding the selected parameter (e.g. temperature, pressure, flow rate, etc.) to the controller 22. In some cases, the controller 22 may use the data from the equipment interface module 30 to evaluate the system's operation and/or performance. For example, the controller 22 may compare data related to the difference in temperature (delta T) between the return air side and the discharge air side of the HVAC system 4 to a previously determined delta T limit stored in the controller 22 to determine a current operating performance of the HVAC system 4.

The illustrative security system 14 may include a central controller 38 and a number of sensors/devices 12a, 12b, 12c (collectively, 12). While the security system controller 38 is illustrated as a separate controller from the HVAC controller 22, it is contemplated that the security system controller 38 and the HVAC controller 22 may be provided as a single controller which communicates with and controls both the HVAC system 4 and the security system 14. The sensor/devices 12 may be configured to detect threats within and/or around the building 2. In some cases, some of the sensor/devices 12 may be constructed to detect different threats. For example, some of the sensor/devices 12 may be limit switches located on doors and windows of the building 2, which are activated by entry of an intruder into the building 2 through the doors and windows. Other suitable security sensor/devices 12 may include fire, smoke, water, carbon monoxide, and/or natural gas detectors, to name a few. Still other suitable security system sensor/devices 12 may include motion sensors that detect motion of intruders in the building 2 or noise sensors or microphones that detect the sound of breaking glass. It is contemplated that the motion sensor may be passive infrared (PIR) motion sensors, a microwave motion sensor, an ultrasonic motion sensor, a tomographic motion sensor, a video camera having motion detection software, a vibrational motion sensor, etc. In some cases, one or more of the sensor/devices 12 may include a video camera. In some cases, the sensor/devices 12 may include a horn or alarm, a damper actuator controller (e.g. that closes a damper during a fire event), a light controller for automatically turning on/off lights to simulate occupancy, and/or any other suitable device/sensor. These are just examples. More generally, the sensor/devices 12 may be any type of sensor or device suitable for operation in a building automation system.

During operation of the illustrative security system 14, the central controller 38 monitors the status of each of the sensor/devices 12. Upon detecting a change of status in one of the sensor/devices 12, the central controller may activate an alarm device, record and/or transmit live video from one of the sensor/devices 12, operate an actuator, contact an off-site central monitoring station (not shown), and/or perform any other suitable action.

Each of the sensor/devices 12 may be operatively connected to the central controller 38 via a corresponding communications port (not explicitly shown). It is contemplated that the communications port may be wired and/or wireless. When the communications port is wireless, the communications port may include a wireless transceiver, and the central controller 38 may include a compatible wireless transceiver. It is contemplated that the wireless transceivers may communicate using a standard and/or a proprietary communication protocol. Suitable standard wireless protocols may include, for example, cellular communication, ZigBee, Bluetooth, WiFi, IrDA, dedicated short range communication (DSRC), EnOcean, or any other suitable wireless protocols, as desired.

The building 2 may be further provided with additional network connected or "smart" devices (e.g., WiFi enabled), also known as Internet of Things (IoT) devices. These devices may include lighting 40, home appliances 18 (such as, but not limited to, robotic vacuums, coffee pots, etc.), water heaters 16, voice activated smart speakers (e.g., AMAZON ECHO™ or GOOGLE HOME™), WiFi enabled power outlets, garage door openers, door locks, televisions, speakers, doorbells, water valves, video cameras, wearable devices, etc. Other devices in the building 2 may include, but are not limited to, a radiofrequency receiver, a thermal imager, a radar device, a lidar device, an ultrasound device, etc. It is contemplated that the additional network connected devices may be in communication with or configured to communicate or interface with the HVAC controller 22 and/or the central security controller 38. In some instances, the additional network connected devices may have one or more individual controllers which in turn communicate with the HVAC controller and/or the security controller 38.

Figure 2:
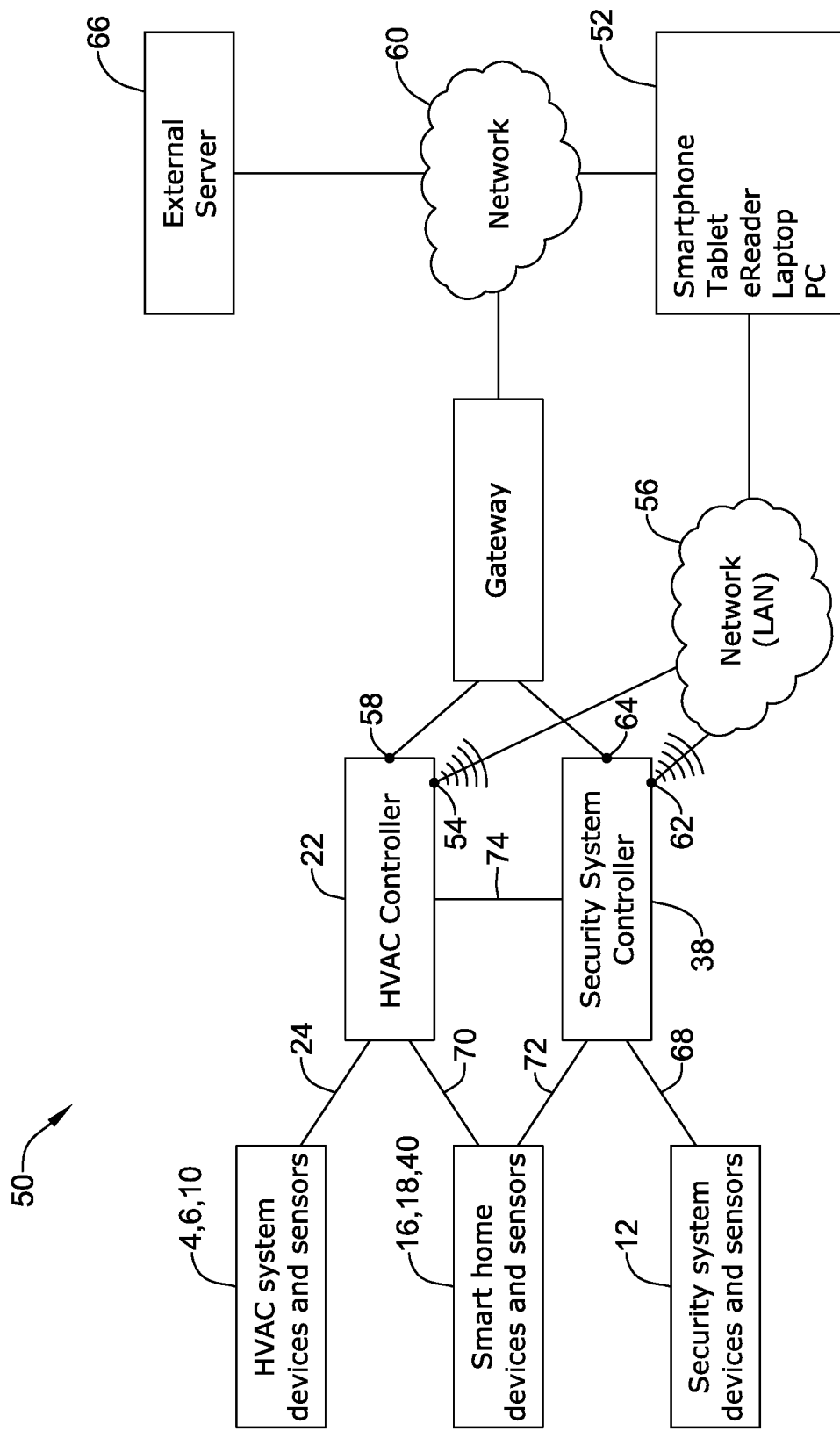
FIG. 2 is a schematic block diagram of an illustrative home or building automation system in communication with illustrative external devices and networks.

FIG. 2 is a schematic view of a home automation system 50 that facilitates remote access to, control of, and/or external communication to/from the HVAC system 4, the security system 14, and/or other home automation devices 16, 18, 40 shown in FIG. 1. The home automation system 50 may be considered a building control system or part of a building control system. The illustrative home automation system 50 includes an HVAC controller, for example, controller 22 (see FIG. 1), that is configured to communicate with and control one or more HVAC components 6 of the HVAC system 4 and a security system controller 38 (see FIG. 1) that is configured to communicate with and control one or more security sensors and/or devices 12. As discussed above, the controllers 22, 38 may be provided as separate and discrete control units or combined into a single control unit, as desired. Further, while not explicitly shown, the smart home devices and sensors 16, 18, 40 may communicate with control programs or controllers which in turn communicate with the HVAC controller 22 and/or security system controller 38. Alternatively, the smart home devices and sensors 16, 18, 40 may be configured to communicate directly with the HVAC controller 22 and/or security system controller 38.

The HVAC controller 22 may communicate with the one or more HVAC components 6 of the HVAC system 4 via a wired or wireless link 24 and with the smart home devices and sensors 16, 18, 40 (and/or the control programs thereof) via a wired or wireless link 70. Similarly, the security system controller 38 may communicate with one or more security sensors and/or devices 12 via a wired or wireless link 68 and with the smart home devices and sensors 16, 18, 40 (and/or the control programs thereof) via a wired or wireless link 72. If provided separately, it is not required for both the HVAC controller 22 and the security system controller 38 to be in communication with the smart home devices and sensors 16, 18, 40 (and/or the control programs thereof). For example, the HVAC controller 22 and the security system controller 38 may be in communication with one another via a wired or wireless link 74 such that information may be passed between the HVAC controller 22 and the security system controller 38.

Additionally, the controllers 22, 38 may communicate over one or more wired or wireless networks that may accommodate remote access and/or control of the controllers 22, 38 via another device 52 such as a smart phone, tablet, e-reader, laptop computer, personal computer, key fob, or the like. As shown in FIG. 2, the HVAC controller 22 may include a first communications port 54 for communicating over a first network 56, and in some cases, a second communications port 58 for communicating over a second network 60. Similarly, the security system controller 38 may include a first communications port 62 for communicating over the first network 56, and in some cases, a second communications port 64 for communicating over the second network 60. In some cases, the first network 56 may be a wireless local area network (LAN), and the second network 60 (when provided) may be a wide area network or global network (WAN) including, for example, the Internet. In some cases, the wireless local area network 56 may provide a wireless access point and/or a network host device that is separate from the controllers 22, 38. In other cases, the wireless local area network 56 may provide a wireless access point and/or a network host device that is part of at least one of the controller 22, 38. In some cases, the wireless local area network 56 may include a local domain name server (DNS), but this is not required for all embodiments. In some cases, the wireless local area network 56 may be an ad-hoc wireless network, but this is not required.

In some cases, the controllers 22, 38 may be programmed to communicate over the second network 60 with an external web service hosted by one or more external web servers 66. A non-limiting example of such an external web service is Honeywell's TOTAL CONNECT™ web service. The controllers 22, 38 may be configured to upload selected data via the second network 60 to the external web service 66 where it may be collected, stored, and/or analyzed on the external web server 66. In some cases, the data may be indicative of the performance of the HVAC system 4, the security system 14, and/or the smart home devices and sensors 16, 18, 40. In other cases, the data may be indicative of building activity or lack thereof. Additionally, the controllers 22, 38 may be configured to receive and/or download selected data, settings, and/or services sometimes including software updates from the external web service over the second network 60. The data, settings and/or services may be received automatically from the web service, downloaded periodically in accordance with a control algorithm, and/or downloaded in response to a user request. In some cases, for example, the HVAC controller 22 may be configured to receive and/or download an HVAC operating schedule and operating parameter settings such as, for example, temperature set points, humidity set points, start times, end times, schedules, window frost protection settings, and/or the like from the web server 66 over the second network 60. In some instances, the controllers 22, 38 may be configured to receive one or more user profiles having at least one operational parameter setting that is selected by and reflective of a user's preferences. In still other instances, the controllers 22, 38 may be configured to receive and/or download firmware and/or hardware updates such as, for example, device drivers from the web server 66 over the second network 60. Additionally, the controllers 22, 38 may be configured to receive local weather data, weather alerts and/or warnings, major stock index ticker data, and/or news headlines over the second network 60. These are just some examples.

Depending upon the application and/or where the home automation user is located, remote access and/or control of the controllers 22, 38 may be provided over the first network 56 and/or the second network 60. A variety of remote wireless devices 52 may be used to access and/or control the controllers 22, 38 from a remote location (e.g. remote from the controllers 22, 38) over the first network 56 and/or second network 60 including, but not limited to, mobile phones including smart phones, tablet computers, laptop or personal computers, wireless network-enabled key fobs, e-readers, and/or the like. In many cases, the remote wireless devices 52 are configured to communicate wirelessly over the first network 56 and/or second network 60 with the controllers 22, 38 via one or more wireless communication protocols including, but not limited to, cellular communication, ZigBee, REDLINK™, Bluetooth, WiFi, IrDA, dedicated short range communication (DSRC), EnOcean, and/or any other suitable common or proprietary wireless protocol, as desired.

In some cases, one or more application program codes (i.e., apps) stored in the memory of the remote device 52 may be used to remotely access and/or control the controllers 22, 38. Similarly, an application program code (app) may be used to remotely access and/or control the smart home devices and sensors 16, 18, 40. The application program code (app) may be provided for downloading from an external web service, such as the web service hosted by the external web server 66 (e.g., Honeywell's TOTAL CONNECT™ web service) or another external web service (e.g., ITUNES® or Google Play). In some cases, the app may provide a remote user interface for interacting with the controllers 22, 38 and/or smart home devices and sensors 16, 18, 40 at the user's remote device 52. For example, through the user interface provided by the app(s), a user may be able to change the operating schedule and operating parameter settings such as, for example, temperature set points, humidity set points, start times, end times, schedules, window frost protection settings, accept software updates and/or the like. Additionally, through the user interface provided by the app(s) the user may be able to arm and/or disarm the security system 14, view sensor status, view live or previously captured videos or still images and/or the like. Further, through the user interface provided by the app(s) the user may be able to view the status of the smart home devices and sensors 16, 18, 40, change a state of the smart home devices and sensors 16, 18, 40 (e.g., turn on/off), change a control parameter (e.g., a water heater temperature set point), and/or the like.

Communications may be routed from the user's remote device 52 to the web server 66 and then, from the web server 66 to the appropriate controller 22, 38. In some cases, communications may flow in the opposite direction such as, for example, when a user interacts directly with the controllers 22, 38 to change an operating parameter setting such as, for example, a schedule change or a set point change, or an association of a security system sensor 12 with an arming mode, etc. The change made at the appropriate controller 22, 38 may then be routed to the web server 66 and then from the web server 66 to the remote device 52 where it may reflected by the application program(s) executed by the remote device 52. In some cases, one or both controllers 22, 38 may be used to change an operating parameter in the smart home devices and sensors 16, 18, 40.

In other cases, a user may be able to interact with the controllers 22, 38 via a user interface provided by one or more web pages served up by the web server 66. The user may interact with the one or more web pages using a variety of internet capable devices to effect a change at the controllers 22, 38 as well as view usage data and energy consumption date related to the usage of the HVAC system 4, security events or status related to the security system 12, and/or information regarding the smart home devices and sensors. In still yet another case, communication may occur between the user's remote device 52 and the controllers 22, 38 without being relayed through a server. These are just some examples.

Figure 3:
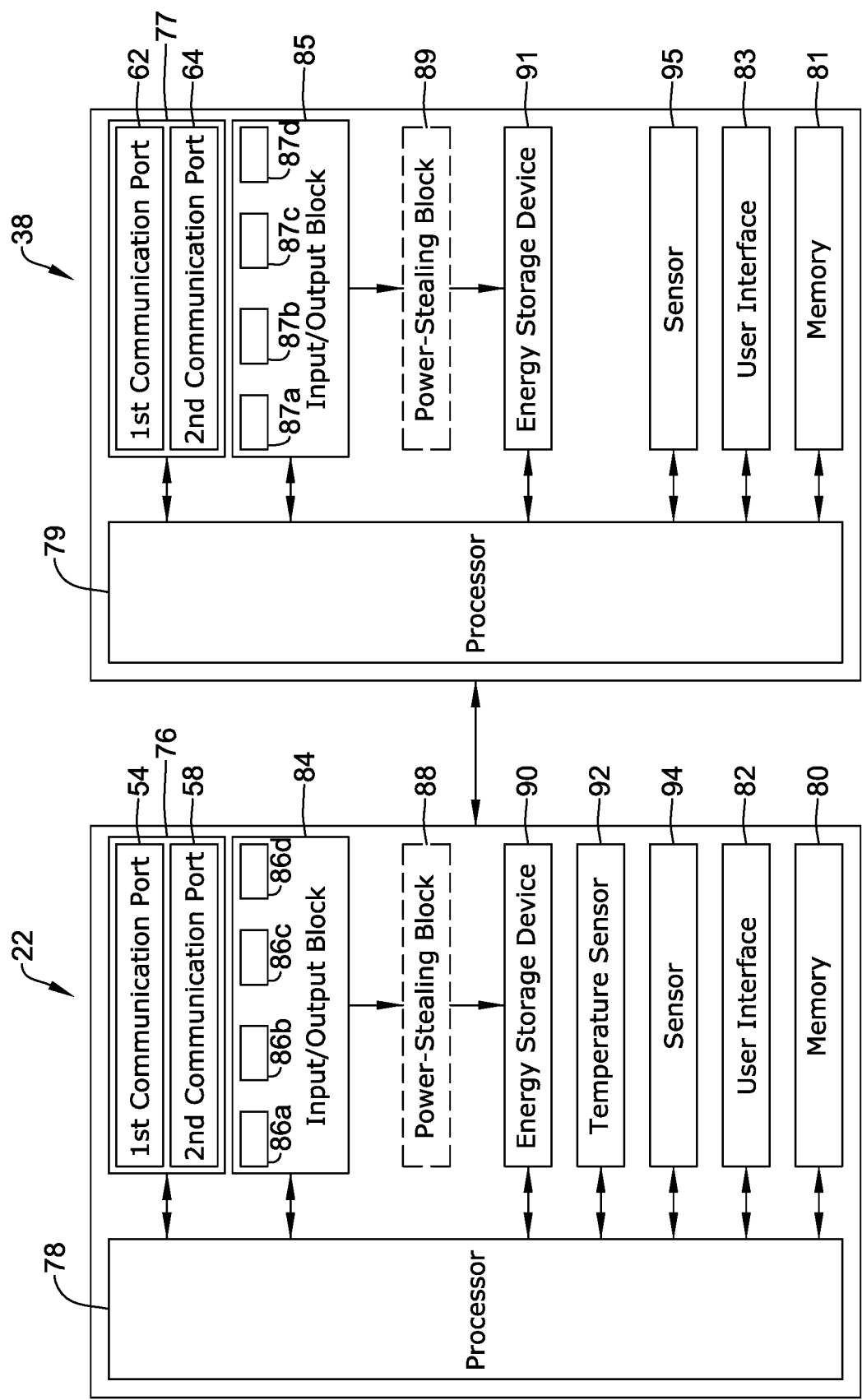
FIG. 3 is a schematic block diagram of first and second illustrative controllers.

FIG. 3 is an illustrative schematic block diagram of the HVAC controller 22 in communication with the security system controller 38 of FIG. 2. As discussed above with reference to FIG. 2, the HVAC controller 22 and/or the security system controller 38 may be accessed and/or controlled from a remote location over the first network 56 and/or the second network 60 using a remote wireless device 52 such as, for example, a smart phone, a tablet computer, a laptop or personal computer, a wireless network-enabled key fob, an e-reader, and/or the like. In some instances, the HVAC controller 22 may be a thermostat, but this is not required. As shown in FIG. 3, the HVAC controller 22 and the security system controller 38 may each include a communications block 76, 77 having a first communications port 54, 62 for communicating over a first network (e.g. a wireless LAN) and a second communications port 58, 64 for communicating over a second network (e.g. a WAN or the Internet). The first communications port 54, 62 can be a wireless communications port including a wireless transceiver for wirelessly sending and/or receiving signals over a first wireless network 56. Similarly, the second communications port 58, 64 may be a wireless communications port including a wireless transceiver for sending and/or receiving signals over a second wireless network 60. In some cases, the second communications port 58, 64 may be in communication with a wired or wireless router or gateway for connecting to the second network, but this is not required. In some cases, the router or gateway may be integral to (e.g., within) the HVAC controller 22 and/or the security system controller 38 or may be provided as a separate device. Additionally, the illustrative HVAC controller 22 and the security system controller 38 may each include a processor (e.g. microprocessor, microcontroller, etc.) 78, 79 and a memory 80, 81. The HVAC controller 22 and the security system controller 38 may each also include a user interface 82, 83, but this is not required. In some cases, only one of the HVAC controller 22 or the security system controller 38 may be provided with a user interface 82, 83. In some cases, one or both of the HVAC controller 22 and the security system controller 38 may include a timer (not shown). The timer may be integral to the processor 78, 79 or may be provided as a separate component. The respective memory 80, 81 of the illustrative HVAC controller 22 and the security system controller 38 may be in communication with the respective processor 78, 79. The memory 80, 81 may be used to store any desired information, such as the aforementioned control algorithm, set points, schedule times, diagnostic limits such as, for example, differential pressure limits, delta T limits, security system arming modes, and the like. The memory 80, 81 may be any suitable type of storage device including, but not limited to, RAM, ROM, EPROM, flash memory, a hard drive, and/or the like. In some cases, the processor 78, 79 may store information within the memory 80, 81, and may subsequently retrieve the stored information from the memory 80, 81.

In many cases, the HVAC controller 22 may include an input/output block (I/O block) 84 having a number of wire terminals (e.g. 86a-86d) for receiving one or more signals from the HVAC system 4 and/or for providing one or more control signals to the HVAC system 4. For example, the I/O block 84 may communicate with one or more HVAC components 6 of the HVAC system 4. The HVAC controller 22 may have any number of wire terminals for accepting a connection from one or more HVAC components 6 of the HVAC system 4.

However, how many wire terminals are utilized and which terminals are wired is dependent upon the particular configuration of the HVAC system 4. Different HVAC systems 4 having different HVAC components and/or type of HVAC components 6 may have different wiring configurations. As such, an I/O block 84 having four wire terminals, as shown in FIG. 3, is just one example and is not intended to be limiting. In some cases, the I/O block 84 may be configured to receive wireless signals from one or more HVAC components 6 or sensors 10. Alternatively, or in addition to, the I/O block 84 may communicate with another controller, which is in communication with one or more HVAC components of the HVAC system 4, such as a zone control panel in a zoned HVAC system, equipment interface module (EIM) (e.g. EIM 34 shown in FIG. 1) or any other suitable building control device. It is further contemplated that the I/O block 84 may communicate with another controller which controls a separate building control system, such as, but not limited to the security system controller 38.

Similarly, the security system controller 38 may include an input/output block (I/O block) 85 having a number of wire terminals (e.g. 87a-87d) for receiving one or more signals from the security system 12 and/or for providing one or more control signals to the security system 12. For example, the I/O block 85 may communicate with one or more sensors 12 of the security system 14. The security system controller 38 may have any number of wire terminals for accepting a connection from one or more sensors 12 of the security system 14. However, how many wire terminals are utilized and which terminals are wired is dependent upon the particular configuration of the security system 14. As such, an I/O block 85 having four wire terminals, as shown in FIG. 3, is just one example and is not intended to be limiting. In some cases, the I/O block 85 may be configured to receive wireless signals from one or more security sensors 12. Alternatively, or in addition to, the I/O block 85 may communicate with another controller, which is in communication with one or more controllers which controls a separate building control system, such as, but not limited to the HVAC controller 22.

In some cases, a power-transformation block 88, 89 may be connected to one or more wires of the I/O block 84, 85, and may be configured to bleed or steal energy from the one or more wires of the I/O block 84, 85. The power bled off of the one or more wires of the I/O block may be stored in an energy storage device 90, 91 that may be used to at least partially power the HVAC controller 22 or the security system controller 38. In some cases, the energy storage device 90, 91 may be capacitor or a rechargeable battery. In addition, the HVAC controller 22 and/or the security system controller 38 may also include a back-up source of energy such as, for example, a battery that may be used to supplement power supplied to the HVAC controller 22 or the security system controller 38 when the amount of available power stored by the energy storage device 90, 91 is less than optimal or is insufficient to power certain applications. Certain applications or functions performed by the HVAC controller 22 or the security system controller 38 may require a greater amount of energy than others. If there is an insufficient amount of energy stored in the energy storage device 90, 91, then, in some cases, certain applications and/or functions may be prohibited by the processor 78, 79.

The HVAC controller 22 may also include one or more sensors such as for example, a temperature sensor, a humidity sensor, an occupancy sensor, a proximity sensor, and/or the like. In some cases, the HVAC controller 22 may include an internal temperature sensor 92, as shown FIG. 3, but this is not required. The HVAC controller 22 may also communicate with one or more remote temperature sensors, humidity sensors, and/or occupancy sensors 10 located throughout the building or structure. Additionally, the HVAC controller may communicate with a temperature sensor and/or humidity sensor located outside of the building or structure for sensing an outdoor temperature and/or humidity if desired.

In some cases, the HVAC controller 22 may include a sensor 94 that is configured to determine if a user is in proximity to the building controller. Similarly, the security system controller 38 may include a sensor 95 that is configured to determine if a user is in proximity to the security system controller 38. In some cases, the sensor 94, 95 may be a motion sensor or a proximity sensor such as, for example, a passive infrared (PIR) sensor. In certain cases in which the sensor 94, 95 is a motion sensor or a proximity sensor, the sensor 94, 95 may be located remotely from the HVAC controller 22 and/or the security system controller 38 and may be in wireless communication with the HVAC controller 22 and/or the security system controller 38 via one of the communication ports.

In yet another example, the sensor 94, 95 may be configured to determine that the user is in proximity to or is expected to be in proximity to the HVAC controller 22 and/or the security system controller 38 upon detecting that the user's remote device 52 is connected to the building's wireless network which, in some cases, may be the same network to which the HVAC controller 22 and/or the security system controller 38 is also connected. Such functionality is shown and described in U.S. Patent Publication No. 2014/0031989 entitled "HVAC CONTROLLER WITH WIRELESS NETWORK BASED OCCUPANCY DETECTION AND CONTROL", the entirety of which is incorporated by reference herein for all purposes.

In still other cases, the user's remote device 52 may be configured to determine that a user is in proximity to the HVAC controller 22 and/or the security system controller 38 upon sensing a user's interaction with the HVAC controller 22 and/or the security system controller 38 via the user interface provided at the HVAC controller 22 and/or the security system controller 38. For example, the sensor 94, 95 may be configured to sense when the screen of the user interface 82, 83 is touched and/or when a button provided at the user interface 82, 83 is pressed by a user. In some cases, the sensor 94, 95 may be a touch sensitive region provided on the user interface 82, 83 when the user interface 82, 83 incorporates a touch screen display. In other cases, the sensor 94, 95 may be associated with a hard button or soft key that is provided separate from a display of the user interface 82, 83.

In some cases, upon detecting or determining that a user is in proximity to the HVAC controller 22 and/or the security system controller 38, the sensor 94,95 may deliver a signal to the processor 78, 79 indicating that the user is in proximity to the HVAC controller 22 or the security system controller 38. In other cases, upon detecting or determining that a user is in proximity to the HVAC controller 22 or the security system controller 38, the sensor 94, 95 may be configured to transmit a signal to a remote server 66 over a second network 60 via the communications block 76, 77.

The user interface 82, 83, when provided, may be any suitable user interface that permits the HVAC controller 22 or the security system controller 38 to display and/or solicit information, as well as accept one or more user interactions with the HVAC controller 22 or the security system controller 38. For example, the user interface 82, 83 may permit a user to locally enter data such as temperature set points, humidity set points, starting times, ending times, schedule times, diagnostic limits, responses to alerts, associate sensors to alarming modes, and the like. In one example, the user interface 82, 83 may be a physical user interface that is accessible at the HVAC controller 22 or the security system controller 38, and may include a display and/or a distinct keypad. The display may be any suitable display. In some instances, a display may include or may be a liquid crystal display (LCD), and in some cases an e-ink display, fixed segment display, or a dot matrix LCD display. In other cases, the user interface 82, 83 may be a touch screen LCD panel that functions as both display and keypad. The touch screen LCD panel may be adapted to solicit values for a number of operating parameters and/or to receive such values, but this is not required. In still other cases, the user interface 82, 83 may be a dynamic graphical user interface.

In some instances, the user interface 82, 83 need not be physically accessible to a user at the HVAC controller 22 or the security system controller 38. Instead, the user interface 82, 83 may be a virtual user interface 82, 83 that is accessible via the first network 56 and/or second network 60 using a mobile wireless device such as one of those remote devices 52 previously described herein. In some cases, the virtual user interface 82, 83 may be provided by an app or apps executed by a user's remote device for the purposes of remotely interacting with the HVAC controller 22 or the security system controller 38. Through the virtual user interface 82, 83 provided by the app on the user's remote device 52, the user may change temperature set points, humidity set points, starting times, ending times, schedule times, diagnostic limits, respond to alerts, update their user profile, view energy usage data, arm or disarm the security system, configured the alarm system, and/or the like. In some instances, changes made to the HVAC controller 22 or the security system controller 38 via a user interface 82, 83 provided by an app on the user's remote device 52 may be first transmitted to an external web server 66. The external web server 66 may receive and accept the user inputs entered via the virtual user interface 82, 83 provided by the app on the user's remote device 52, and associate the user inputs with a user's account on the external web service. If the user inputs include any changes to the existing control algorithm including any temperature set point changes, humidity set point changes, schedule changes, start and end time changes, window frost protection setting changes, operating mode changes, and/or changes to a user's profile, the external web server 66 may update the control algorithm, as applicable, and transmit at least a portion of the updated control algorithm over the second network 60 to the HVAC controller 22 or the security system controller 38 where it is received via the second port 58, 64 and may be stored in the memory 80, 81 for execution by the processor 78, 79. In some cases, the user may observe the effect of their inputs at the HVAC controller 22 or the security system controller 38.

Rather than a dedicated app, the virtual user interface 82, 83 may include one or more web pages that are transmitted over the second network 60 (e.g. WAN or the Internet) by an external web server (e.g. web server 66). The one or more web pages forming the virtual user interface 82, 83 may be hosted by an external web service and associated with a user account having one or more user profiles. The external web server 66 may receive and accept user inputs entered via the virtual user interface and associate the user inputs with a user's account on the external web service. If the user inputs include changes to the existing control algorithm including any temperature set point changes, humidity set point changes, schedule changes, start and end time changes, window frost protection setting changes, operating mode changes, and/or changes to a user's profile, the external web server 66 may update the control algorithm, as applicable, and transmit at least a portion of the updated control algorithm over the second network 60 to the HVAC controller 22 or the security system controller 38 where it is received via the second port 58, 64 and may be stored in the memory 80, 81 for execution by the processor 78, 79. In some cases, the user may observe the effect of their inputs at the HVAC controller 22 or the security system controller 38.

In some cases, a user may use either the user interface 82, 83 provided at the HVAC controller 22 or the security system controller 38 and/or a virtual user interface 82, 83 as described herein. The two types of user interfaces 82, 83 that may be used to interact with the HVAC controller 22 or the security system controller 38 are not mutually exclusive of one another. However, in some cases, a virtual user interface 82, 83 may provide more advanced capabilities to the user. It is further contemplated that a same virtual user interface 82, 83 for both the HVAC controller 22 and the security system controller 38. Further, as described above, the HVAC controller 22 and the security system controller 38 may be formed as a single controller configured to perform the functions of both the HVAC controller 22 and the security system controller 38 from a single device.

Figure 4:
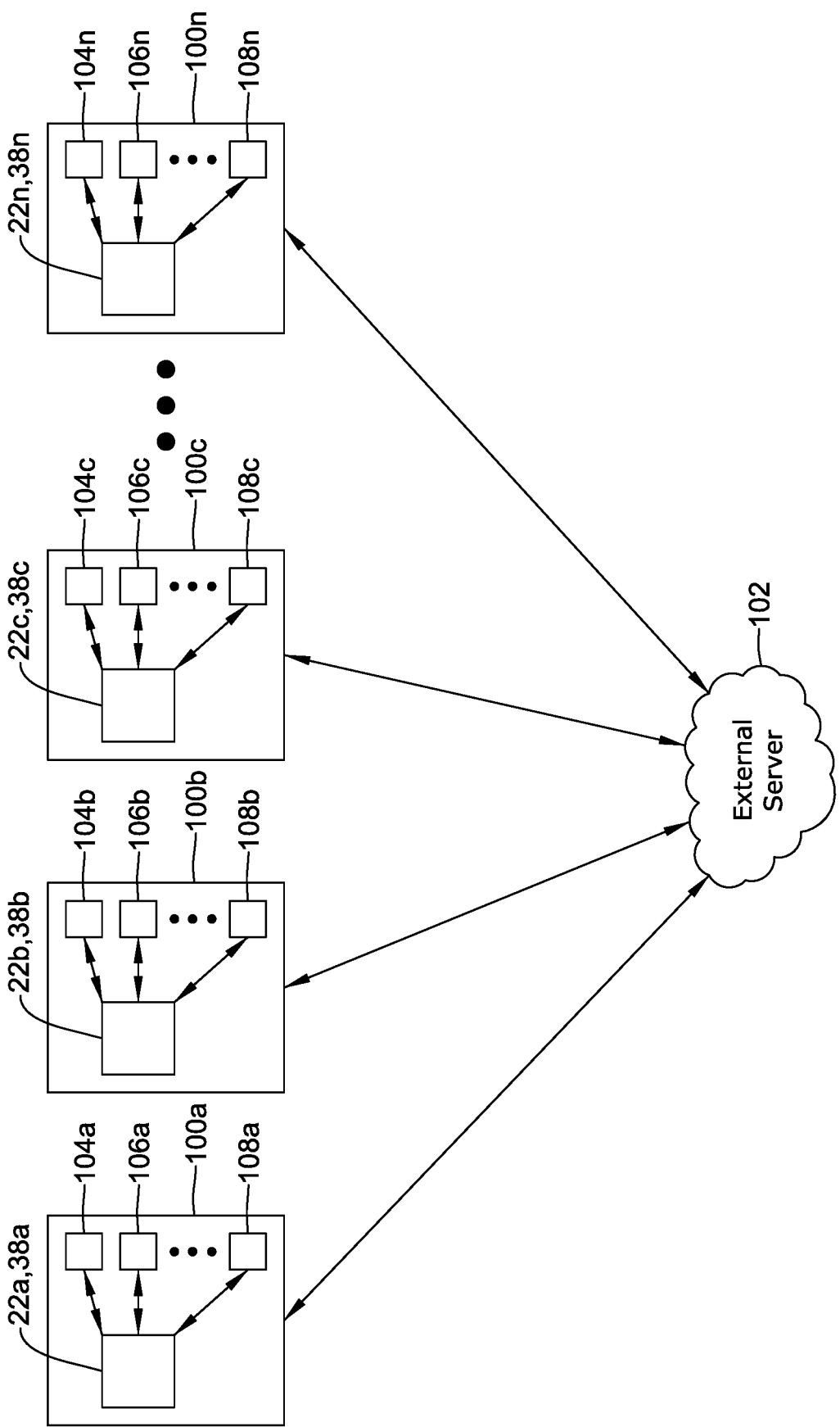
FIG. 4 is a schematic block diagram of a plurality of controllers in communication with an external server.

FIG. 4 is a schematic diagram of a plurality of buildings 100a, 100b, 100c, 100n (collectively, 100) each having one or more HVAC controllers 22a-n and/or security system controllers 38a-n in communication with an external web server 102, such as the external web server 66 described herein. It is contemplated that devices from any number of buildings 100 may be providing information to the external server 102. In some cases, hundreds, thousands, tens of thousands, or more buildings may be in communication with the external web server 102. The buildings 100a-n may each have one or more of: an HVAC system 104a-n, a security system 106a-n, or a smart home device, appliance, or sensor 108a-n such as any of those described above with respect to FIG. 1. The HVAC system 104a-n, security system 106a-n, and/or smart home devices 108a-n may be in communication with the HVAC controller 22a-n, security system controller 38a-n, a combined HVAC and security controller, or other controller configured to operate the systems and devices within the respective building 102a-n. The controllers 22a-n, 38a-n from each building may then relay performance data, operating parameters, alarm conditions, gas and/or electricity usage, etc. to the external server 102. In some cases, the data may be relayed through a WAN to the external server 102. In some cases, the external server 102 may be configured to aggregate the data obtained from the individual buildings 100. As will be described in more detail herein, once aggregated, the data can be analyzed for trends, to identify outliers, to improve algorithms, etc.

It is contemplated that the HVAC sensors 10, security system sensors 12, and/or smart home devices and sensors 16, 18, 40 may be tuned to filter out activity or readings that do not appear to be pertinent to the respective system or device. For example, motion sensors in security systems may be tuned to filter out movement of pets. This may be done such that pets having the freedom to roam a residence while the owner is out do not set off security systems (e.g., create an alarm condition) or trigger comfort systems (thus countering any energy savings that may otherwise by gained by changing set point while the owners are out of the residence). In some cases, it may be desirable to utilize HVAC sensors 10, security system sensors 12, and/or smart home devices and sensors 16, 18, 40 to monitor one or more pets within the residence. Generally, the HVAC sensors 10, security system sensors 12, and/or smart home devices and sensors 16, 18, 40 may be analyzed to determine if there are any issue or problems with the pet(s) when no one (e.g., no person) is home or at the residence. If an issue or problem with the pet(s) has been determined to be present, the system may notify the pet owner and/or a pet caretaker to alert them of the detected issue or problem.

Figure 5:
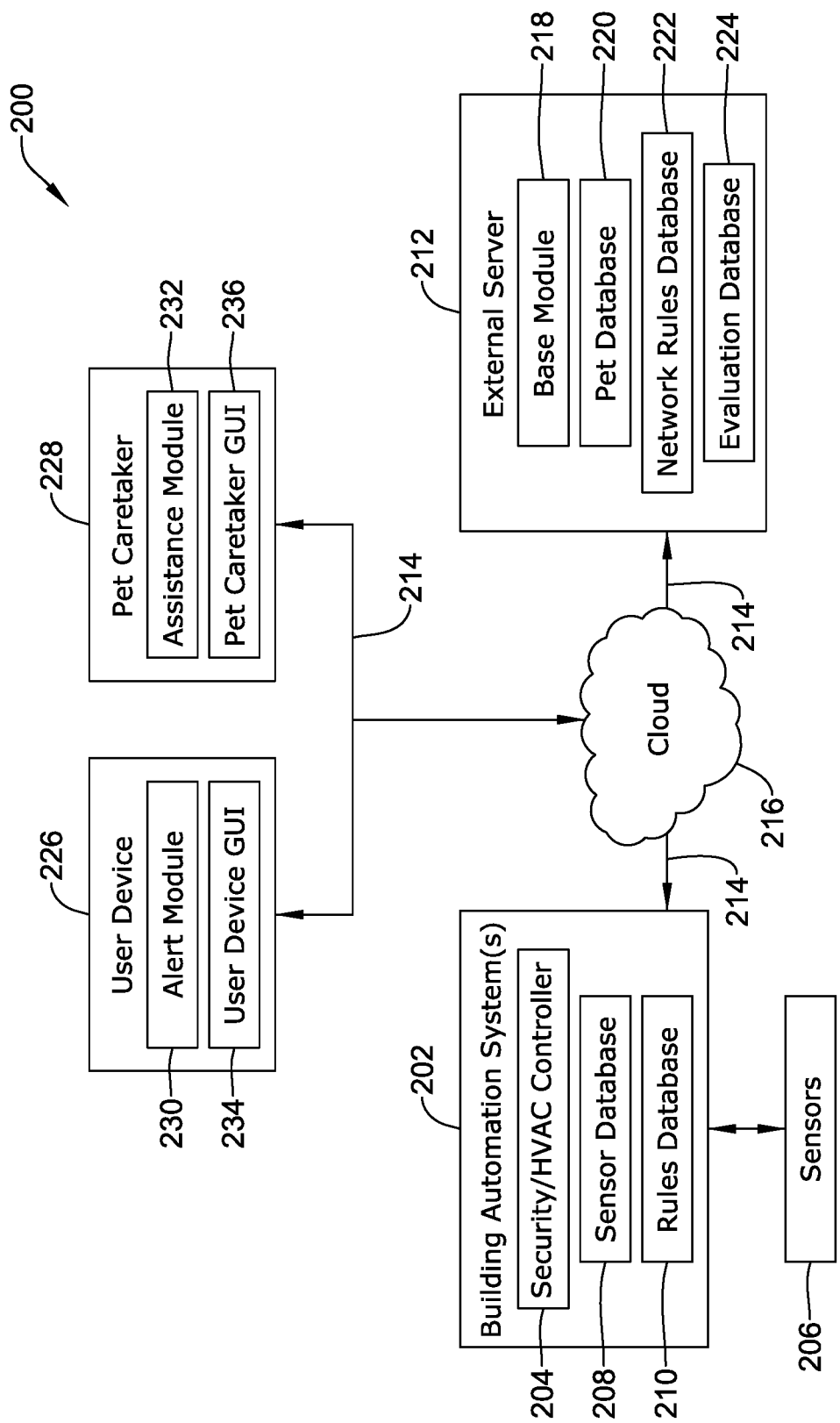
FIG. 5 is a schematic block diagram of a pet monitoring system.

FIG. 5 is an illustrative block diagram of a pet monitoring system 200. The system 200 may include one or more building automation systems 202 positioned within or around a building or residence. The building automation system(s) 202 may include, but are not limited to, an HVAC system, a lighting control system, a fire suppression systems, a security system, internet enabled or "smart" devices, etc. The building automation system(s) 202 include at least one controller 204, such as, but not limited to, an HVAC controller 22 and/or a security system controller 38 described herein. The controller 204 may be similar in form and function to the controllers 22, 38 described above and include the components and capabilities. The controller 204 is configured to be in communication with one or more sensors 206 that may be used to detect a condition within or near a space of the building having the building automation system(s) 202. The sensors 206 may include, but are not limited to, temperatures sensors, humidity sensors, carbon dioxide sensors, occupancy sensors, proximity sensors, motion sensors, limit switches, noise sensors or microphones, video cameras, still image cameras, a horn or alarm, fire, smoke, water, carbon monoxide, and/or natural gas detectors, a damper actuator controller (e.g. that closes a damper during a fire event), a light controller, smart light bulbs, home appliances such as, but not limited to, robotic vacuums, coffee pots, etc., water heaters, voice activated smart speakers (e.g., AMAZON ECHO™ or GOOGLE HOME™), WiFi enabled power outlets, garage door openers, door locks, televisions, speakers, doorbells, water valves, video cameras, wearable devices, radiofrequency receivers, thermal imagers, radar devices, lidar devices, ultrasound devices, etc. The building automation system(s) 202 may maintain a first, or sensor, database 208 of data obtained from the one or more sensors 206. For example, a memory accessible by the processor of the controller 204 may be configured to store the database 208 of sensor data such that historical and current sensor data is readily accessible. The building automation system(s) 202 may maintain a second, or rules, database 210 including a set of rules or algorithms that may be used to identify certain conditions within or near the building or residence and determine if a recommendation should be made to a pet owner or a pet caretaker, as will be described in more detail herein. A set of rules may include at least one rule, two or more rules, three or more rules, etc. Each rule may define one or more events that include one or more detectable conditions that when present may be indicative of an alert condition. The one or more detectable or sensed condition are indicative of a condition of the space in which the pet (e.g., pet 5) resides may be data available from any of, but not limited to, the sensors 206 described herein. The space may be interior to a home or exterior to the home, as desired. The alert condition may indicate a pet is sick, is in danger, is exhibiting undesirable behavior, etc. Each rule may further include a recommended action to take in response to the defined event. The action may include, but is not limited to issuing an alert, activating additional sensors, increasing sensitivity of particular sensors, increasing measurement frequency, etc. A memory accessible by the processor of the controller 204 may be configured to store the rules database 210 such that the rules and algorithms are readily accessible.

The rules database 210 may be downloaded onto the controller 204 located within the residence from an external server(s) 212 over a network 214. The network 214 may be a wide area network or global network (WAN), such as the Internet. The external server(s) 212 may be a suite of hardware and software which may sometimes be referred to as "the cloud." In some cases, the communication may pass through an intermediary server 216 or cloud network, but this is not required. In some cases, the cloud 216 may provide the ability for communication amongst the home automation system(s) 202, the external server(s) 212, and/or one or more remote devices 226, 228. While the external server(s) 212 is illustrated as connected to a single building having a building automation system(s) 202, the external server(s) 212 may be connected to a plurality of building automation systems as described with respect to FIG. 4. The external server(s) 212 may collect and store data from the various sensors 206 from the one or more connected home automations systems 202. The data from the sensors 206 may be collected by a base module 218 at the external server(s) 212. In some cases, sensor data as well as information regarding various pets may be stored in a database 220 within the server(s) 212. Some illustrative data regarding pets may include type of animal, breed, age, health conditions, sex, activity level, weight, height, etc. As will be described in more detail herein, the base module 218 may analyze the sensor data and determine if the rules stored in the network rules database 222 need to be or would be improved by updating. The external server(s) 212 may further include an evaluation database 224. The evaluation database 224 may be configured to store recommendations sent to a pet owner and/or pet caretaker along with the corresponding sensor data that triggered the recommendation. This data may be analyzed to determine if adjustments to the rules in the network rules database 222 should be made.

Returning to the home automation system(s) 202, the sensor data may be analyzed for characteristics of pet activity or lack thereof. For example, in one illustrative embodiment, motion sensors may be tuned to detect pet activity. A rule may be present in the rules database 210 that defines the amount of movement of the pet over a predetermined period of time that may be deemed necessary for the pet to be considered safe and well. In some cases, the processing of the sensor data and comparison of the data to the rules 208 may be performed in the cloud 216 or remote from the controller 204, although this is not required. If the data from the sensors 206 indicates that the pet has not moved sufficiently over the predetermined period of time, the controller 204 determines that a recommendation or notification be sent to the pet owner's device 226 and/or to the pet caretaker's device 228. A pet caretaker may be a person or service contracted by the pet owner to care for the pet when the owner is unavailable. The remote devices 226, 228 may be any internet connected device including a smart phone, tablet, e-reader, laptop computer, personal computer, etc. The notification may be received by an application program code (app) or other module 230, 232 within the remote devices 226, 228. In some cases, the notification may be sent to both the pet owner and the pet caretaker simultaneously. In other cases, the notification may be sent to only one of the pet owner or the pet caretaker. It is contemplated that the pet owner may customize who receives notifications and when through the app 230 or controller 204. For example, the pet owner may choose to be notified first and the pet caretaker subsequently notified through an action taken by the pet owner or through the pet owner failing to acknowledge the alert. Once the notification has been received at the notification module, the notification may be displayed on the user interface 234, 236 of the device 226, 228. In some cases, an audio alert (e.g., a beep or chime) or a haptic alert (e.g., a vibration) may accompany the notification to alert the pet owner or pet caretaker of the notification.

It is contemplated that the rules database 210 for a particular building may be tailored to the particular pet or pets residing in the building. For example, the rules database 210 may include a plurality of rules established for a particular type of pet, breed of pet, age, weight, etc. For example, older pets may be expected to be less active than younger pets. The network rules database 222 may include a plurality of different rules sets tailored to different animals, breeds, ages, weights, etc. The appropriate set of rules may be downloaded to the controller 204 in response to a pet owner identifying the details of the pet to the controller 204. The pet owner may enter pet details at the user interface of the controller 204, through a remote device, or through a web client, as described above.

Figure 6:
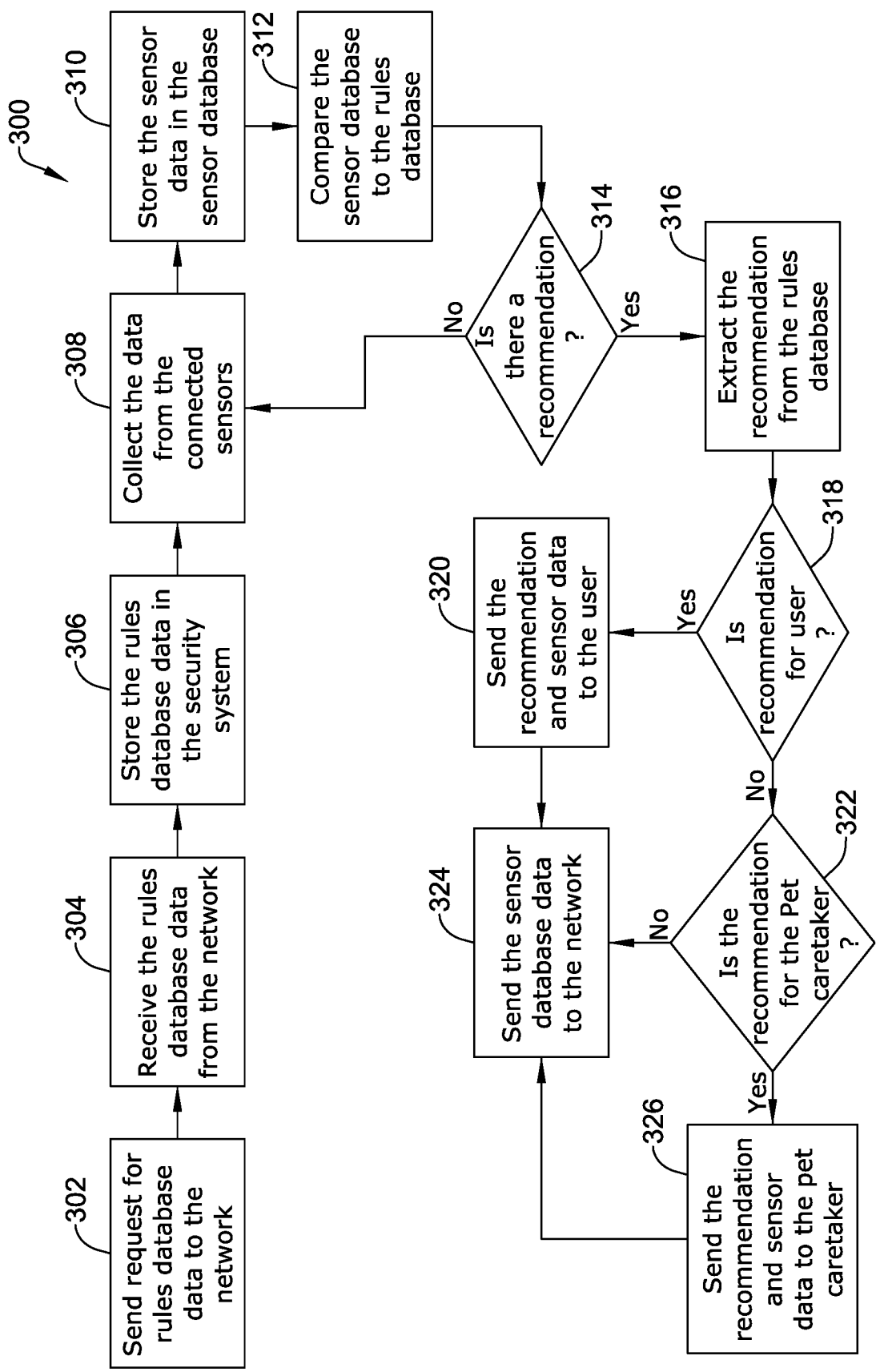
FIG. 6 is a flow chart of an illustrative method for monitoring a pet.

FIG. 6 illustrates a flow chart 300 of an illustrative method for determining if alert condition is present and if a notification should be issued. To begin, the user may use the controller 204 (or a remote device 226) to send a request to obtain the rules database to the external server(s) 212, as shown at block 302. Alternatively, or additionally, the controller 204 may automatically request the rules database. The user may provide information related to the pet or pets in the building along with the request. The external server(s) 212 may determine which particular set of rules in the network rules database 222 most closely align with the characteristics of the user's pet(s). The external server(s) 212 may then send the appropriate set of rules back to the controller 204, as shown at block 304. The rules received at the controller 204 may be stored within the controller 204 or in a remote location (e.g., a cloud network), as shown at block 306. It is contemplated that the user may initiate a request for rules or updated rules on demand or as desired. Alternatively, or additionally, the controller 204 may be configured to automatically request the most up-to-date rules from the external server(s) 212 at predetermined time schedules. It is further contemplated that additionally, or alternatively, the external server(s) 212 may be configured to automatically send or push revised rules to the controller 204 as the rules are updated. For example, the external server(s) 212 may keep a log of which controller 204 has which set of rules. As individual sets of rules are updated in response to user feedback or alarm conditions, the external server(s) 212 may automatically deliver the revised rules to the controller 204.

The controller 204 may collect data from one or more sensors 206, as shown at block 308. It is contemplated that the controller 204 may be configured to collect data in response to a particular event, such as, but not limited to the arming of a security system, an HVAC system entering an "away" mode, lack of detection of humans, the remote device exiting a predetermined geographical location (e.g., a geofence), activation of a button on the controller 204 etc. Alternatively, or additionally, the sensors 206 may continually collect data. The sensors 206 may be configured to sense a condition within the building or a particular room of the building. Some illustrative conditions may include, but are not limited to, motion, temperature, sound, humidity, etc. As the controller 204 collects data from the one or more sensors 206, the data is stored in the sensor database 208, as shown at block 310. The sensor database 208 may be integral to the controller 204 or may be stored in a cloud network 216, as desired.

Referring briefly to FIG. 7, which illustrates an example sensor database 400, the sensor database 208 may record additional information beyond the measured or perceived parameter. The sensor database 208 may record the system identification 402. The system identification 402 may tie the data to a particular controller 204 such that data can be aggregated with other systems having similar pet demographics. For example, the pet database 220 of the external server(s) 212 link home automations systems 202 have similar pet demographics such that the data can be aggregated correctly and used to refine the appropriate set of rules.

The sensor database 400 may also record the name 404 and location 406 of the sensor 206. This may allow different rules to be applied to specific sensors 206. The rule database 208 also records the actual data 408 received from the sensor 206. The data may be binary (e.g., on/off, yes/no) or a numerical value. Additionally the time 410 the data was obtained and the length of time or duration 412 the reading was valid is also recorded.

Referring to FIG. 9, which illustrates an example pet database 600, similar in form and function to the pet database 220 described above, which may be stored on the external server 212, the pet database 600 may record and store multiple sensor databases 400. The pet database 600 may include similar information to sensor database 400 for an individual system 202, but include multiple sensor database from different controllers 204 and/or locations. For example, the pet database 600 may include a system identification number 602, the name of the sensor 604, the location of the sensor 606, data recorded by the sensor 608, the time the data was recorded 610, and the length of the time the reading was valid 612.

Returning to FIG. 6, the sensor database 208 may be compared to the rules database 210, as shown at block 312. This may be performed at predefined time intervals. As the sensor database 208 is compared to the rules database 210, if the sensor data matches a rule, a recommendation may be provided. It is contemplated that the storing of data (block 310) and/or the comparison of data to the rules (block 312) may be performed by the local controller 204 or in a cloud network 216, as desired. If there is not a recommendation, the collection of sensor data (block 308), storage of sensor data (block 310), and comparison of collected data to rules (block 312) will continue. In other words, the rules will be repeatedly applied to the collected data to identify when a rule defined event occurs. If the collected data matches a rule that provides a recommendation, the recommendation may be extracted from the rules database 210, as shown at block 316.

Referring briefly to FIG. 8, which illustrates an example system rules database 500. The network rules database 222 may be similar to the system rules database but may include additional rules or sets of rules which may not be applicable to a particular pet security system 200. The rules database 500 illustrated in FIG. 8 is not intended to provide a complete listing of the events which may result in a recommended action. Instead, the rules database 500 is provided as an example of some rules that may be generated for monitoring a pet, such as, but not limited to a dog or a cat. As can be seen in FIG. 8, in some cases, the data from a single sensor meeting a predetermined criteria may be sufficient to generate a recommendation, as shown at rows 502, 508, 514. In other cases, the combined data from two or more sensors meeting predetermined criteria may generate a recommendation, as shown at rows 504, 506, 510, 512, 516, 518. Some rule defined events which may result in a recommendation include, but are not limited to, a failure to detect a presence of a pet (e.g., using motion sensors, still cameras, video cameras, etc.), failure to detect a motion of a pet (e.g., using motion sensors, still cameras, video cameras, etc.), a detected temperature over a predetermined temperature, a detected humidity over a predetermined humidity, a detected temperature under a predetermined temperature, a temperature of the pet above and/or below a predetermined temperature (e.g., using thermal imaging), combinations of any of proceeding, and/or any of the preceding (or combinations thereof) occurring for a predetermined length of time. These are just some examples.

One example rule may define a rule defined event as no motion for a predetermined length of time 502, 514. As can be seen in FIG. 8, the length of time may vary depending on the type of pet. It is further contemplated that the length of time may vary depending on breed and/or age of the pet. Other rules may include two or more ruled defined event which are both required to be present to activate the recommendation. For example, another example rule may define the rule defined events as no motion and a temperature (indoor or outdoor depending on the location of pet) above a predetermined threshold where both no motion and the temperature criteria are met for a predetermined length of time 504, 516. Yet another example rule may define the rule defined events as no motion, a temperature (indoor or outdoor depending on the location of pet) above a predetermined threshold, a humidity (indoor or outdoor depending on the location of pet) above a predetermined threshold where all of the motion, temperature and humidity criteria are met for a predetermined length of time 506, 518, In another example, the rule defined events may include a pet temperature (body temperature) above a predetermined threshold for a predefined length of time 508. Another example rule may define the rule defined events as a pet temperature (body temperature) above a predetermined threshold and a room temperature (or outdoor temperature) above a predetermined threshold where both the body temperature and the air temperature criteria are met for a predetermined length of time 510. Another example rule may define the rule defined events as a pet temperature (body temperature) above a predetermined threshold, a room temperature (or outdoor temperature) above a predetermined threshold, and no pet motion where all of the body temperature, the air temperature, and the motion criteria are met for a predetermined length of time 512. These are just some examples and are not intended to limit the disclosure to a particular set of rules for determining a pet's status or safety.

The recommendation 520 may be specific to the sensed condition and the perceived severity of the situation. For example, in some cases, only the owner is notified. In other cases, the owner is notified and the pet caretaker is simultaneously notified and/or requested to check on the pet. In some cases, the recommendations may be informational while in other cases, the recommendation may require an action on the part of an owner or caretaker. Regardless of whether the recommendation is providing information or suggesting an action, the recommendation may be provided to the remote device of the pet owner and/or the pet caretaker, as defined in the rule. It is further contemplated that in some cases, the recommendation may require the controller 204 to activate one or more additional sensors.

Returning again to FIG. 6, when the recommendation has been extracted from the rules database 210, the controller 204 may then perform the recommended action defined in the rule having the defined event present in the building. For example, the controller 204 may first determine if the recommendation is for the pet owner, as shown at block 318. If the recommendation is for the pet owner, the recommendation and/or sensor data may be sent to the pet owner's device 226, as shown at block 320. After notification of the pet owner, or substantially simultaneously therewith, the sensor database 208 may be sent to the external server(s) 212, as shown at block 324, where it is stored and can be used to improve the network rules database 222. Additionally, or alternatively, the pet owner may provide feedback regarding the safety of the pet in the conditions that generated the alarm event or notification. In some cases, the external server(s) 212 may be configured to poll the controller 204 for sensor data without an alarm event.

Returning to block 318, if the recommendation is not for the pet owner, the controller 204 may determine if the recommendation is for the pet caretaker, as shown at block 322. If the recommendation is for the pet caretaker, the recommendation and/or sensor data may be sent to the pet caretaker's device 228, as shown at block 326. After notification of the pet owner or substantially simultaneously therewith, the sensor database 208 may be sent to the external server(s) 212, as shown at block 324, where it is stored and can be used to improve the network rules database 222. If the recommendation is not for the pet caretaker, the sensor database 208 may be sent to the external server(s) 212, as shown at block 324. Additionally, or alternatively, the pet caretaker may provide feedback regarding the safety of the pet in the conditions that generated the alarm event or notification. In some cases, the external server(s) 212 may be configured to poll the controller 204 for sensor data without an alarm event.

FIG. 10 illustrates an example evaluation database 700 configured to be maintained on an external server 212, similar in form and function to the evaluation database 224 described above. Data from multiple pet security systems may be aggregated into a single database or a plurality of databases characterized by pet demographic. The evaluation database 700 may store all the recommendations that are sent out to either the user or the pet caretaker along with the corresponding sensor data that required the recommendation to be sent. This may allow for the data to be evaluated to determine if there is a potential adjustment that should be made (e.g., in the case of a heat wave adjust rules to reflect easy overheating of animals). The evaluation database 700 contains the date and time the data was collected, the type of animal it was collected for, the plurality of sensor data or sensor ranges that triggered the accompanying recommendation, the duration, the recommendation that was given, and the occurrences in which the event occurred.

The various modules described herein disclosed herein may be implemented or performed with a general purpose processor, a digital signal processor (DSP), an application specific integrated circuit (ASIC), a field programmable gate array signal (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Those skilled in the art will recognize that the present disclosure may be manifested in a variety of forms other than the specific embodiments described and contemplated herein. Accordingly, departure in form and detail may be made without departing from the scope and spirit of the present disclosure as described in the appended claims.

What is claimed is:

1. A method for monitoring a pet in a space of a building, wherein the space includes one or more sensors each sensing a sensed condition, the method comprising:
 storing two or more rules, each rule defining:
  a rule defined event that is detectable via one or more of the sensed conditions sensed by one or more of the sensors, wherein a respective rule defined event for a rule of the two or more rules comprises one or both of a failure to detect a presence of the pet or a failure to detect motion of the pet; and
  a recommended action to take in response to the corresponding rule defined event;
 monitoring the one or more sensed conditions of the one or more sensors over time;
 repeatedly applying the two or more rules to the one or more monitored sensed conditions of the one or more sensors to identify when a rule defined event of the two or more rules occurs; and
 performing the recommended action defined by the rule that resulted in the rule defined event, wherein performing the recommended action comprises outputting an alert to at least one recipient user device of a set of user devices, and wherein the at least one recipient user device comprises one or both of a user device associated with a pet owner or a user device associated with a pet caretaker.

2. The method of claim 1, wherein the rule defined event for at least one rule comprises a failure to detect a presence of the pet.

3. The method of claim 1, wherein the rule defined event for at least one rule comprises a failure to detect motion of the pet.

4. The method of claim 1, wherein the one or more sensors include a motion sensor, and wherein the rule defined event for at least one rule comprises no detected pet motion from the motion sensor over a predetermined period of time.

5. The method of claim 4, wherein the motion sensor comprises a camera.

6. The method of claim 1, wherein the one or more sensors include a temperature sensor, and wherein the rule defined event for at least one rule comprises a detected temperature that remains above a predetermined temperature over a predetermined period of time.

7. The method of claim 1, wherein the one or more sensors include a motion sensor and a temperature sensor, and wherein:
 a first rule defined event of a first rule comprises no detected pet motion from the motion sensor over a first predetermined period of time; and
 a second rule defined event of a second rule comprises a detected temperature that remains above a first predetermined temperature over a second predetermined period of time.

8. The method of claim 7, wherein the one or more sensors further comprises a humidity sensor, and wherein:
 a third rule defined event of a third rule comprises a detected humidity that remains above a predetermined humidity over a third predetermined period of time.

9. The method of claim 7, wherein the first predetermined period of time is longer than the second predetermined period of time.

10. The method of claim 1, wherein the recommended action comprises delivering an alert to a remote device over a network.

11. The method of claim 1, wherein the recommended action comprises activating one or more non-activated sensors.

12. A pet monitoring system configured to be used in a space within a building, the pet monitoring system comprising:
 a first sensor configured to detect a first condition in the space;
 a second sensor configured to detect a second condition in the space;

a memory for storing one or more rules each configured to identify an alert condition for a pet in the space based on the first and/or second conditions in the space;

a communications module configured to communicate with a remote device over a network;

a controller operatively coupled to the first sensor, the second sensor, the memory, and the communications module, the controller configured to:

apply the one or more rules to the first and second detected conditions in the space to identify one or more alert conditions, wherein a respective alert condition of the one or more alert conditions comprises one or both of a failure to detect a presence of the pet or a failure to detect motion of the pet;

determine what, if any, action is required, and if action is required, provide an alert to the remote device via the communications module, wherein to provide the alert, the controller is configured to provide the alert to at least one recipient user device of a set of user devices, and wherein the at least one recipient user device comprises one or both of a user device associated with a pet owner or a user device associated with a pet caretaker.

13. The pet monitoring system of claim 12, wherein the controller is configured to activate a third sensor in response to the one or more alert conditions.

14. The pet monitoring system of claim 12, wherein the first sensor comprises a motion sensor.

15. The pet monitoring system of claim 12, wherein the second sensor comprises a temperature sensor.

16. The pet monitoring system of claim 12, wherein the first sensor and the second sensor are located in the building, the controller and the communications module are implemented by a remote server geographically spaced from the building, and the remote device is a portable handheld device.

17. The pet monitoring system of claim 16, further wherein the controller is operatively coupled to the first sensor and the second sensor at least partially over the network.

18. The pet monitoring system of claim 12, wherein the first sensor and the second sensor are located in the building, the controller and the communications module are located in the building, and the remote device is a portable handheld device.

19. A server for monitoring a pet in a space of a building, the server comprising:

a memory for storing two or more rules, each rule defining:

a rule defined event that is detectable via one or more of sensed conditions in the space, wherein a respective rule defined event for a rule of the two or more rules comprises one or both of a failure to detect a presence of the pet or a failure to detect motion of the pet; and a recommended action to take in response to the corresponding rule defined event;

an input/output port for receiving the one or more sensed conditions from the space;

a controller operatively coupled memory and the input/output port, the controller configured to:

monitor the one or more sensed conditions over time;

repeatedly applying the two or more rules to the one or more monitored sensed conditions to identify when a rule defined event of the two or more rules occurs;

perform the recommended action defined by the rule that resulted in the rule defined event, wherein performing the recommended action comprises outputting an alert to at least one recipient user device of a set of user devices, and wherein the at least one recipient user device comprises one or both of a user device associated with a pet owner or a user device associated with a pet caretaker.

20. The server of claim 19, wherein the one or more sensed conditions comprises presence and/or motion of the pet, and wherein the rule defined event for a first rule of the two or more rules comprises no detected pet motion over a predetermined period of time, and wherein the recommended action of the first rule comprises sending an alert to a remote device via the input/output port.

* * * * *